(12) United States Patent
Halliwell

(10) Patent No.: US 9,815,419 B2
(45) Date of Patent: Nov. 14, 2017

(54) TRIM PANEL

(71) Applicant: JAGUAR LAND ROVER LIMITED, Warwickshire (GB)

(72) Inventor: Martin Halliwell, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/437,554

(22) PCT Filed: Oct. 28, 2013

(86) PCT No.: PCT/EP2013/072532
§ 371 (c)(1),
(2) Date: Apr. 22, 2015

(87) PCT Pub. No.: WO2014/064294
PCT Pub. Date: May 1, 2014

(65) Prior Publication Data
US 2015/0283956 A1    Oct. 8, 2015

(30) Foreign Application Priority Data

Oct. 26, 2012 (GB) ................................ 1219263.9
Nov. 8, 2012 (GB) ................................ 1220161.2

(51) Int. Cl.
*B60J 5/00* (2006.01)
*B60R 13/02* (2006.01)
(Continued)

(52) U.S. Cl.
CPC .... *B60R 13/0206* (2013.01); *B29C 45/14754* (2013.01); *B29C 45/1671* (2013.01);
(Continued)

(58) Field of Classification Search
CPC ............ B60R 13/0206; B60R 13/0243; B60R 13/0275; B29C 45/14754; B29C 45/1671;
(Continued)

(56) References Cited

U.S. PATENT DOCUMENTS 6,053,758 A * 4/2000 Kato ................... H01R 13/639
439/364
2005/0206192 A1    9/2005 Dry
(Continued)

FOREIGN PATENT DOCUMENTS

DE    102 20 026 A1 * 11/2003
DE    10220026 A1    11/2003
(Continued)

OTHER PUBLICATIONS

PCT International Search Report for International application No. PCT/EP2013/072532 dated Jan. 22, 2014.
(Continued)

*Primary Examiner* — Lori L Lyjak
(74) *Attorney, Agent, or Firm* — Carlson, Gaskey & Olds

(57) ABSTRACT

The present invention relates to a trim panel (1; 101) for a motor vehicle. The trim panel (1; 101) has a first connector (11; 103) for mounting the trim panel (1; 101). The first connector (11; 103) is elongated and extends longitudinally along the trim panel (1; 101). The present invention also relates to a method of mounting a trim panel (1; 101); and a method of forming first and second connectors (11, 13; 103, 105).

20 Claims, 5 Drawing Sheets

(51) Int. Cl.
  *B60J 5/04* (2006.01)
  *B29C 45/14* (2006.01)
  *B29C 45/16* (2006.01)
  *F16B 3/00* (2006.01)
  *F16B 11/00* (2006.01)
  *B29K 23/00* (2006.01)
  *B29K 75/00* (2006.01)
  *B29K 77/00* (2006.01)
  *B29L 31/00* (2006.01)

(52) U.S. Cl.
  CPC ......... *B60J 5/0411* (2013.01); *B60J 5/0463* (2013.01); *B60J 5/0468* (2013.01); *B60J 5/0469* (2013.01); *B60R 13/0243* (2013.01); *B60R 13/0275* (2013.01); *F16B 3/00* (2013.01); *F16B 11/006* (2013.01); *B29C 2045/1673* (2013.01); *B29K 2023/12* (2013.01); *B29K 2075/00* (2013.01); *B29K 2077/00* (2013.01); *B29L 2031/7278* (2013.01); *Y10T 29/49876* (2015.01); *Y10T 403/475* (2015.01)

(58) Field of Classification Search
  CPC ...... B60J 5/0411; B60J 5/0468; B60J 5/0469; F16B 3/00; F16B 11/006; Y10T 29/49876; Y10T 403/475; B29K 2023/12; B29K 2075/00; B29K 2077/00; B29L 2031/7278

See application file for complete search history.

(56) References Cited

U.S. PATENT DOCUMENTS

| 2006/0261632 A1 | 11/2006 | Twork | |
| 2008/0054049 A1 | 3/2008 | Cowelchuk et al. | |
| 2008/0169667 A1* | 7/2008 | Siniarski | B60N 3/002 296/37.8 |
| 2010/0196629 A1 | 8/2010 | Mourou et al. | |
| 2012/0235436 A1 | 9/2012 | Sun | |
| 2013/0206335 A1* | 8/2013 | Renius | C09J 5/00 156/305 |

FOREIGN PATENT DOCUMENTS

| EP | 0440286 A2 | 8/1991 |
| EP | 1388449 A1 | 2/2004 |

OTHER PUBLICATIONS

Combined Search and Examination Report under Sections 17 and 18(3) for Application No. GB1219263.9 dated Feb. 22, 2013.

\* cited by examiner

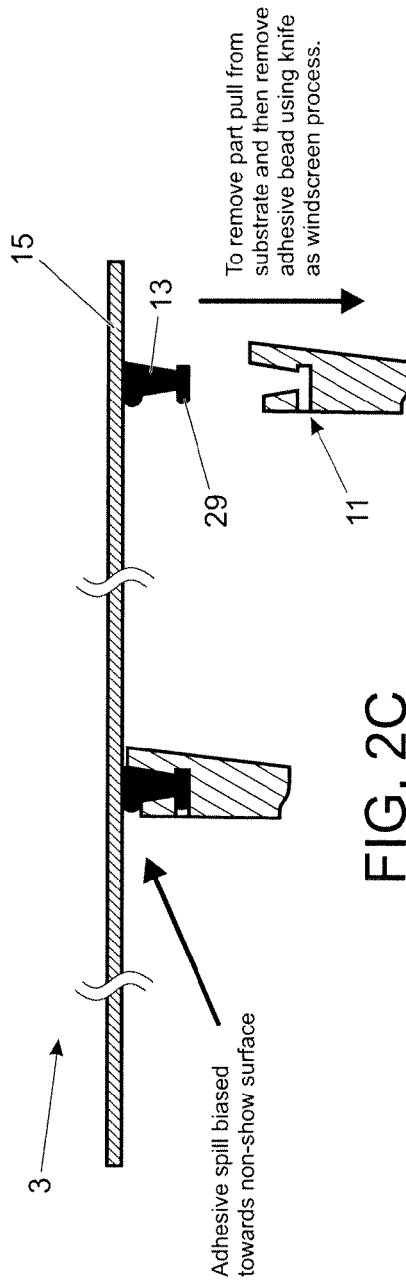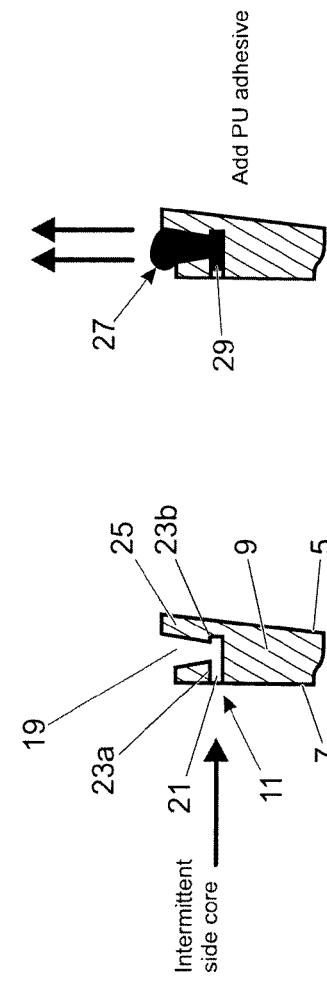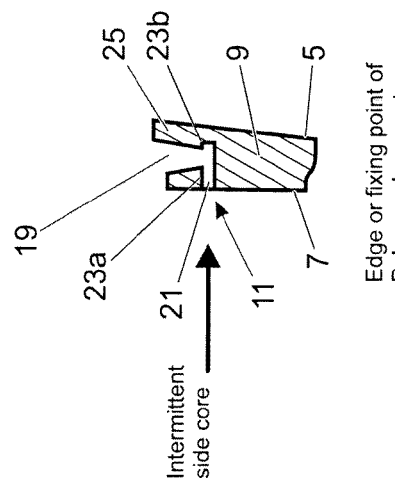

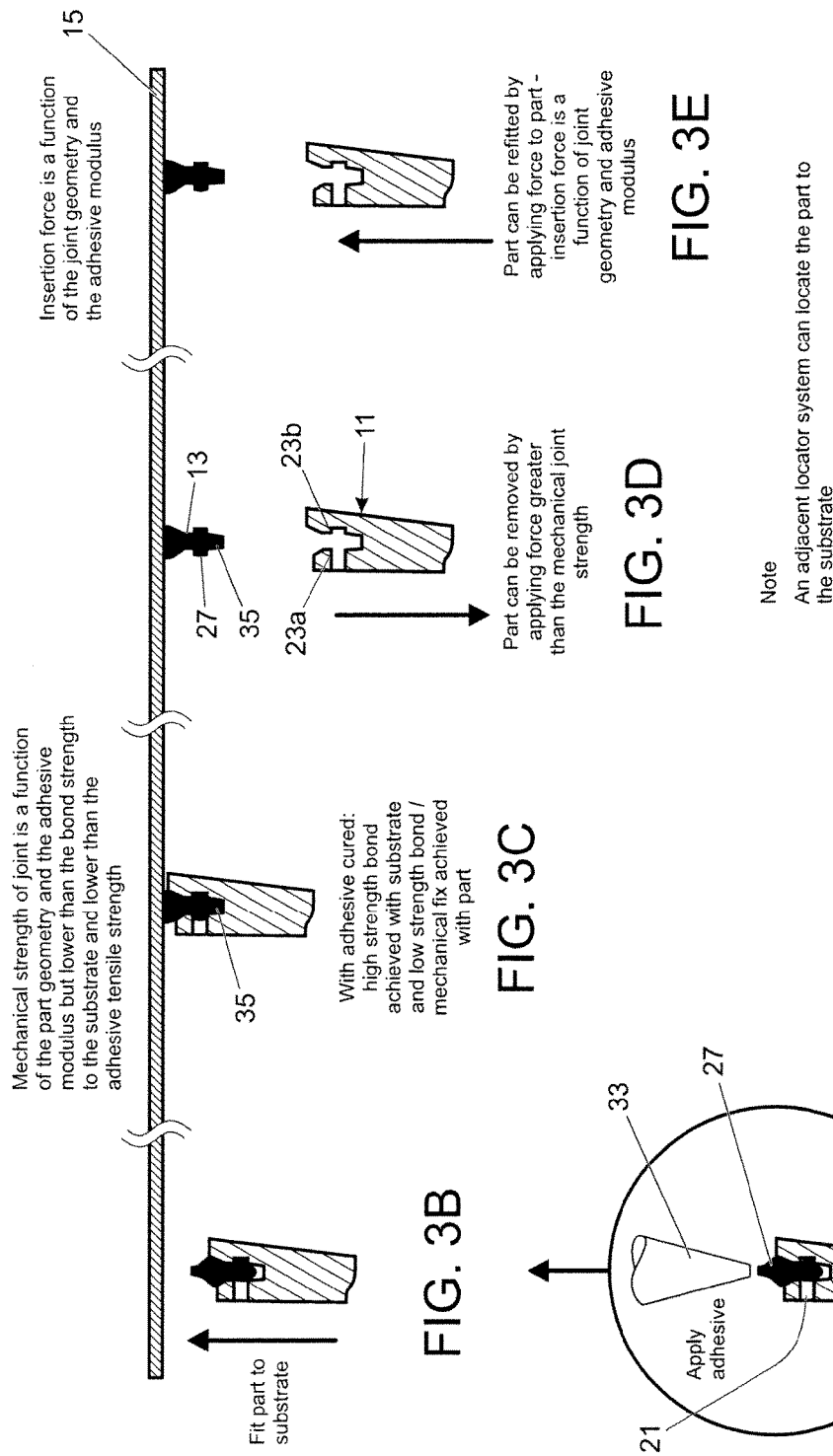

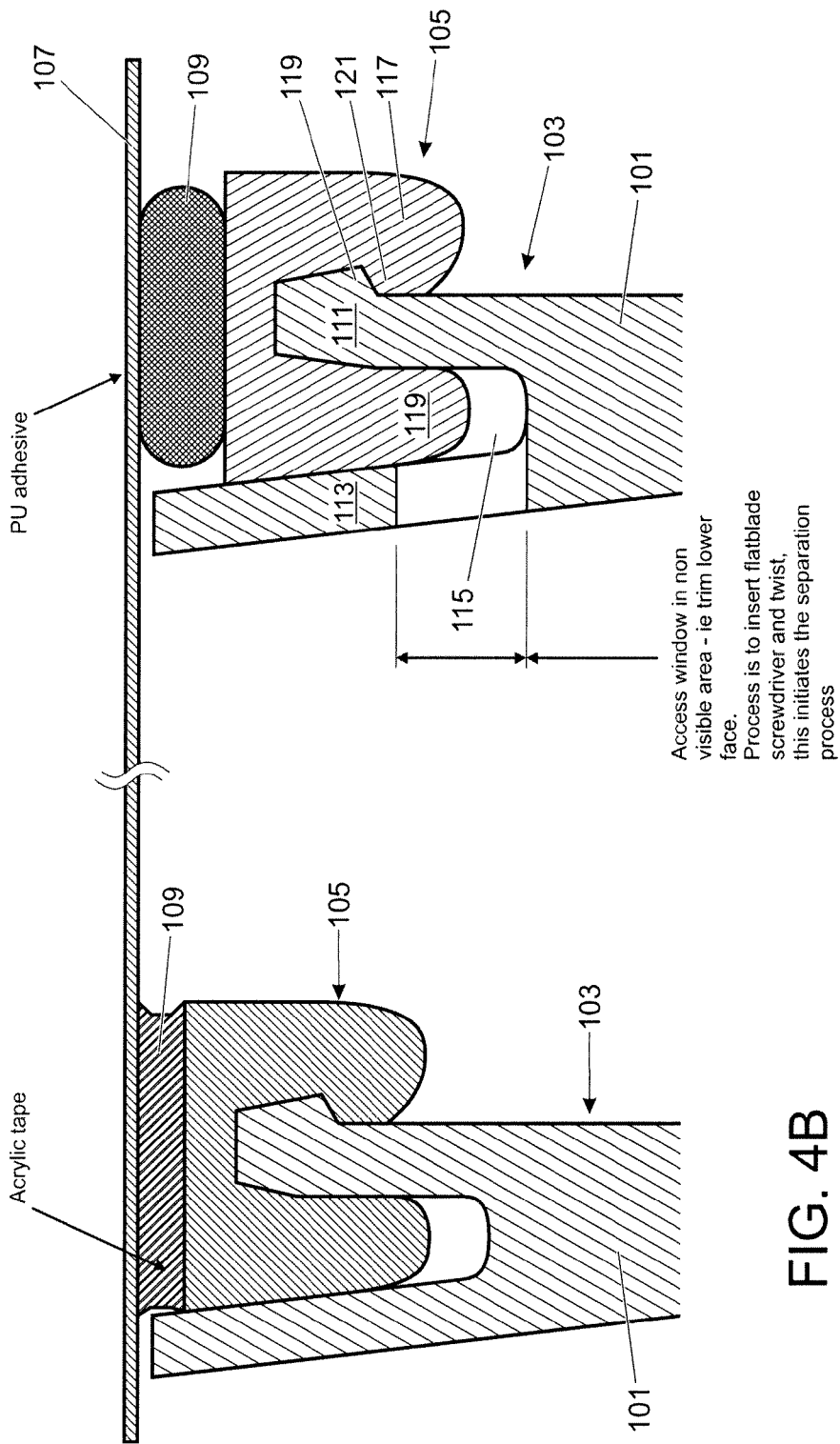

TRIM PANEL

TECHNICAL FIELD

The present invention relates to a trim panel for a motor vehicle and to a method of mounting a trim panel. The present invention also relates to a method of forming first and second connectors. Aspects of the invention relate to a panel, to an assembly, to a method and to a vehicle.

BACKGROUND OF THE INVENTION

It is common to provide trim panels in motor vehicles, for example to provide a decorative panel on an interior of a vehicle door. One approach for mounting trim panels is to provide a series of discrete mechanical fasteners. However, it is difficult to add structural performance to the trim panel using mechanical fasteners due to concentrated loads and stress relaxation.

An alternative to using mechanical fasteners is to use an adhesive to bond the trim panels in place. However, it can be difficult to form an acceptable bond with certain materials, such as polypropylene, used to mould the trim panels.

At least in certain embodiments, the present invention sets out to overcome or ameliorate at least some of the problems associated with the prior art arrangements.

SUMMARY OF THE INVENTION

Aspects of the present invention relate to a trim panel; a method of mounting a trim panel; a mounting assembly; a method of forming first and second connectors and a vehicle. The present invention also relates to a vehicle comprising one or more trim panels of the type described herein.

According to a further aspect of the present invention there is provided a trim panel for a motor vehicle, the trim panel comprising:
  a first connector for mounting the trim panel;
  wherein said first connector is elongated and extends longitudinally along said trim panel. The first connector has a longitudinal axis which extends along the trim panel, for example along a side, an edge or a surface of the trim panel. In use, the first connector can provide support along its length for mounting the trim panel. The first connector can thereby provide continuous support for the trim panel along the length of the first connector. This arrangement can provide a uniform support for the trim panel, rather than a series of point fixings provided by conventional fasteners.

The first connector can extend along at least one side of the trim panel. The first connector can support the trim panel along said at least one side of the trim panel. This mounting arrangement can increase the strength and rigidity of the trim panel, particularly if the first connector extends along more than one side of the trim panel.

The first connector can extend partially or completely along said at least one side of the trim panel. The trim panel can comprise more than one of said first connectors. For example, opposing first connectors could be provided on opposing sides of the trim panel. The first connector can extend partially or completely around the periphery of the trim panel. The first connector could be continuous along an edge of the trim panel, or indeed around the periphery of the trim panel. Alternatively, a plurality of said first connectors could be provided to mount the trim panel. For example, one or more of said first connectors could be provided along each edge of the trim panel.

The first connector can comprise an elongate flange. The elongate flange can comprise a keyed section which can extend along a length of the first connector. Alternatively, the keyed section can be an intermittent cavity cored into the elongate flange. The keyed section can comprise a latching arrangement such as an undercut.

The first connector could be inset from an edge of said at least one side of the panel. Alternatively, the first connector can be provided along the edge of said at least one side of the panel. The first connector can thereby form a peripheral joint for mounting the trim panel.

The first connector can comprise a keyed profile. The keyed profile can, for example, engage a second connector. For example, the first connector can comprise an under-cut for cooperating with the second connector.

The first connector could be attached to the trim panel, for example using an adhesive or a series of mechanical fasteners. Alternatively, the first connector can be formed integrally with the trim panel. For example, the trim panel could be injection moulded to form the first connector. The trim panel can further comprise a skirt which is formed separately or integrally with the trim panel. The skirt can be suitable for hiding the second connector when the trim panel is fitted.

The first connector can cooperate with a second connector to mechanically mount the trim panel. The trim panel can be permanently or releasably mounted. The first connector can be a male connector for cooperating with a female connector. Alternatively, the first connector can be a female connector for cooperating with a male connector. The second connector can extend partially or completely around a periphery of the trim panel for cooperating with the first connector.

The present invention also relates to the trim panel described herein in combination with the second connector. The second connector can be coupled to the first connector. Thus, the second connector can be connected to the trim panel. The second connector can be releasably moulded in the first connector.

An adhesive can be provided on the second connector for fixedly mounting the second connector. The adhesive can be a tape, such as acrylic tape, having adhesive on at least one side thereof. Alternatively, the adhesive can be applied to the second connector, for example as a liquid. The adhesive can bond the second connector directly to a frame member for mounting the trim panel.

The first connector could be used to mount panels other than trim panels. According to a further aspect of the present invention there is provided a panel comprising a first connector for mounting the panel; wherein the first connector is elongated and extends longitudinally along said panel.

According to a further aspect of the present invention there is provided a method of mounting a trim panel of the type described herein. The method can comprise locating the trim panel in a final position in relation to a fixed frame member. The second connector can be located against said fixed panel. The adhesive provided on the second connector is thereby brought into contact with the fixed frame member to bond the second connector to the fixed frame member.

The second connector can be formed separately from the first connector and fixedly mounted on a fixed panel. Alternatively, a second connector can be moulded in the first connector. The second connector can, for example, be moulded from an elastomer or an adhesive, such as polyurethane. The elastomer or adhesive can be introduced in a liquid state and, once cured, be mechanically coupled to the first connector. The mechanical strength of the joint is determined by a function of the adhesive shear strength/modulus and the area of the joint that mechanically holds the elastomer or adhesive. This technique for moulding the second connector in the first connector is believed to be patentable independently of the trim panel described herein.

According to a yet further aspect of the present invention there is provided a mounting assembly comprising a male connector and a female connector, wherein the male connector is moulded in said female connector. The male connector can be releasably formed in said female connector. The female connector can define a keyed profile for releasably retaining the male connector. The mounting assembly can be provided on a trim panel for a motor vehicle.

According to a further aspect of the present invention there is provided a method of moulding a male connector co-operable with a female connector, the method comprising introducing a liquid compound into the female connector to form the male connector. The liquid compound can be an elastomer or a polymer, for example in the polyolefin group of polymers, for moulding the male connector. The method can further comprise the step of allowing the liquid compound to cure inside the female connector. The liquid compound could be introduced intermittently along a length of the female mould, for example to form a series of male connectors having a relatively short (for example circular or oval) transverse cross section. Alternatively, the liquid compound could be introduced along a length of the female mould to form an elongate male connector. The female connector could form part of a trim panel for a vehicle.

The female connector can be formed from a first material and the male connector can be formed from a second material. The first and second materials can be different from each other. One or both of said first and second materials can be resilient to facilitate coupling and/or de-coupling of the male and female connectors. The first and second connectors can be selected to prevent the male and female connectors bonding to each other when the male connector is formed. Thus, the coupling formed between the male and female connectors can be exclusively or predominantly a mechanical coupling (rather than a chemical bond). The female connector can be formed from a thermoplastic polymer, such as polypropylene. The liquid compound can be a synthetic polymer, such as nylon or polyurethane.

The female connector can have an under-cut for mechanically cooperating with the male connector. The male and female connectors can releasably engage each other. The liquid compound can shrink as it cures and this can help separate the male connector and the female connector.

The male connector can be formed by a moulding process performed after the female connector has been removed from a mould. Alternatively, the female connector and the male connector can be formed as part of a multi-shot moulding process. The moulding process can comprise introducing a first shot of moulding material into a mould to mould the female connector and subsequently introducing a second shot of moulding material into the mould to form the male connector. The mould can be re-configured after the female connector has been moulded, for example to form an under-cut in the female connector. The male connector can be moulded thereafter to form the male connector.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

One or more embodiments of the present invention will now be described, by way of example only, with reference to the accompanying figures, in which:

FIG. 2 illustrates the formation of a male connector according to a first embodiment of the present invention for removably mounting the trim panel of FIG. 1;

FIG. 3 illustrates the formation of a male connector according to a second embodiment of the present invention for removably mounting the trim panel of FIG. 1;

FIGS. 4A and 4B illustrate an alternate connection arrangement for removably mounting the trim panel of FIG. 1.

DETAILED DESCRIPTION

Figure 1A:
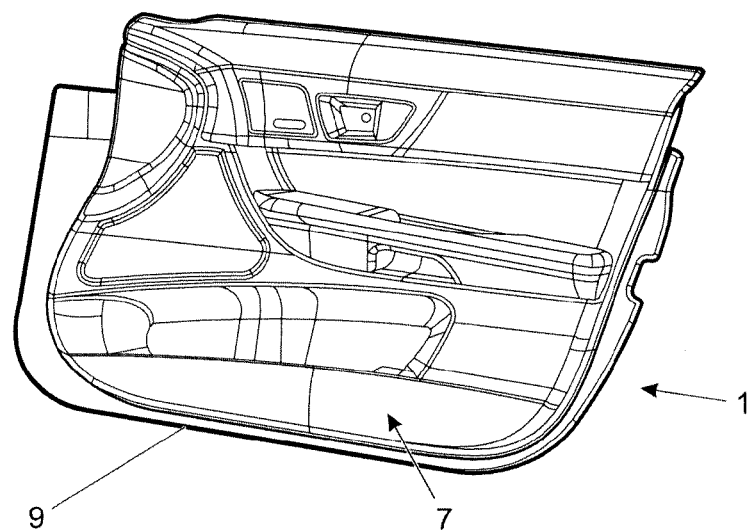
FIGS. 1A and 1B show perspective inner and outer views of a vehicle trim panel in accordance with an embodiment of the present invention.
Figure 1B:
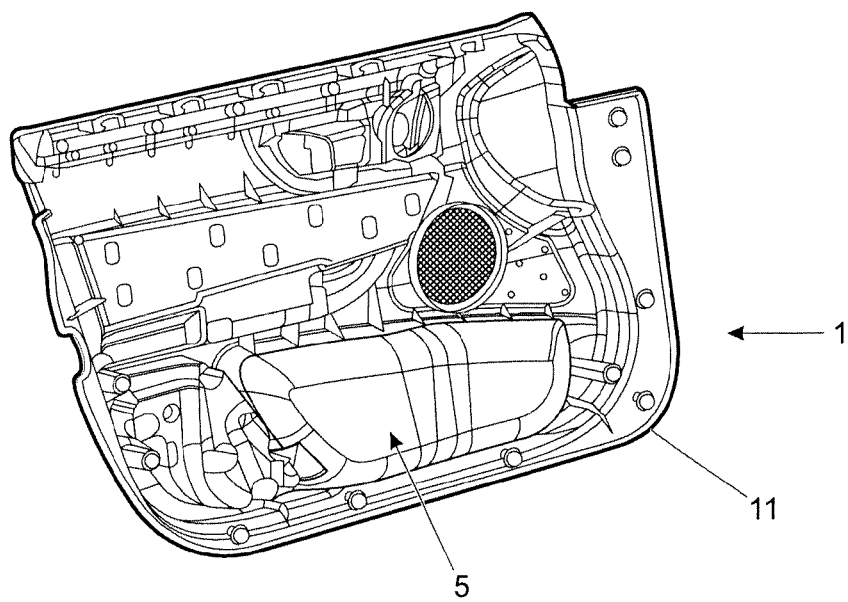

The illustrated embodiment relates to a fixing arrangement for removably mounting a trim panel 1 on an interior of a vehicle door 3. As shown in FIGS. 1A and 1B, the trim panel 1 comprises an inner surface 5, an outer surface 7 and an outside edge 9.

A female connector 11 extends longitudinally along the trim panel 1. In the present embodiment, the female connector 11 is formed continuously along the outside edge 9 of the trim panel 1 for cooperating with a male connector 13 fixedly mounted on an inside of the vehicle door 3. The female connector 11 and the male connector 13 extend around the circumference of the trim panel 1 to provide continuous support along the outside edge 9. As described herein, the female connector 11 releasably engages the male connector 13 to mount the trim panel 1 to a door frame member 15.

The trim panel 1 is a unitary component formed by injection moulding a plastics material, such as polypropylene, into a mould. The mould comprises movable elements to enable the female connector 11 to be removed from the mould after one or more latching features (as described herein) have been moulded. The outer surface 7 of the trim panel 1 is exposed to an interior of the vehicle cabin and has a decorative finish. A decorative material, such as fabric or leather, can optionally be applied to the outer surface 7 of the trim panel 1. The illustrated trim panel 1 is generally rectangular and comprises two pairs of opposing sides joined by rounded corners. It will be appreciated that the present invention can be implemented in trim panels having different shapes and profiles.

A schematic sectional view of the fixing arrangement according to a first embodiment of the present invention is shown in FIGS. 2A-D. The female connector 11 is formed integrally with the trim panel 1 and substantially follows the outer edge 9 of the trim panel 1. With reference to the cross-sectional view in FIG. 2A, the female connector 11 comprises a tapered elongate channel 19 and a transverse recess 21 which is intermittent along the length of the female connector 11. The transverse recess 21 opens into the elongate channel 19 to form inner and outer latching features 23a, 23b which define undercuts for mechanically cooperating with the male connector 13. The female connector 11 further comprises an outer skirt 25 which functions as a shield to hide the male connector 13 from view when the trim panel 1 is fitted.

The male connector 13 is moulded within the female connector 11 by introducing a continuous bead of a liquid polymer 27 into the female connector 11. The liquid polymer 27 cures to form a resilient material which defines the male connector 13. As shown in FIG. 2B, the liquid polymer 27 fills the elongate channel 17 and flows into the transverse recess 19 to form a transverse keyed section 29 for cooperating mechanically with the inner and outer latching features 23a, 23b. The liquid polymer 27 is a compound which does not bond with the trim panel 1, thereby enabling the male connector 13 to be released from the female connector 11 after the liquid polymer 27 has cured. The liquid polymer 27 can, for example, be polyurethane or nylon. The liquid polymer 27 shrinks as it cures and this can also facilitate the release of the male connector 11. A release agent could optionally be provided in the female connector 11 to facilitate release of the male connector 13.

The liquid polymer 27 bonds with the door frame member 15 to fixedly mount the trim panel 1. As shown in FIG. 2C, the trim panel 1 is located in its final position against the door frame member 15 when the liquid polymer 27 is still in a liquid form. The skirt 19 guides any excess liquid polymer 27 inwardly towards a non-show surface (i.e. a surface hidden by the trim panel 1). The trim panel 1 is held in position until the liquid polymer 27 has cured, thereby fixedly mounting the male connector 11 to the vehicle door 3. As shown in FIG. 2D, the trim panel 1 can be removed, for example to provide access to an interior of the vehicle door 3, by applying a pulling force to overcome the mechanical retention provided by the engagement of the keyed section 29 with the inner and outer latching features 23a, 23b. When the trim panel 1 is removed, the male connector 13 remains in situ on the door frame member 15. The male connector 13 can then be removed, for example using a blade, and a new male connector 13 formed by introducing a new bead of liquid polymer 27 into the female connector 11 for re-attaching the trim panel 1.

The female connector 11 and the male connector 13 cooperate to form a peripheral joint for securing the trim panel 1 in position. The mechanical strength of the joint, which is determined by the shear modulus of the cured polymer 25 and the area in shear (determined by the geometry of the female connector 11), is lower than the adhesive tensile strength. By supporting the trim panel 1 around its circumference, the strength and stiffness of the trim panel 1 can be increased. The thickness of the trim panel 1 can potentially be reduced in comparison to conventional trim panels. Moreover, the integrated fixing arrangement can potentially also improve noise, vibration and harshness (NVH) properties of the trim panel 1.

A schematic sectional view of the fixing arrangement according to a second embodiment of the present invention is shown in FIGS. 3A-E. Like components and features will be referenced with like reference numerals.

In this embodiment, the tapered elongate channel 19 extends beyond the transverse recess 21 to form an elongate groove 31. As shown in FIG. 3A, the male connector 13 is moulded within the female connector 11 by introducing a liquid polymer 27 which cures to form a resilient material. The liquid polymer 27 is introduced from an automated nozzle 33 which travels along the length of the tapered elongate channel 19. The volume of liquid polymer introduced into the female connector 11 is controlled so as not to fill the transverse recess 21 and the elongate groove 31, as shown in FIG. 3B. The trim panel 1 is then located against the door frame member 15 and the liquid polymer is displaced into the transverse recess 21 and the elongate groove 31, as shown in FIG. 3C. The skirt 19 guides excess liquid polymer 27 inwardly. The trim panel 1 is held in position until the liquid polymer 27 has cured sufficiently to form the male connector 13 and to secure the trim panel 1 in position.

As shown in FIG. 3D, the trim panel 1 can be removed by overcoming the mechanical retention provided by the engagement of the keyed section 25 with the inner and outer latching features 23a, 23b. As shown in FIG. 3E, the trim panel 1 in this embodiment can subsequently be re-attached by locating the female connector 11 over the male connector 13 and applying pressure to locate the keyed section 27 within the transverse recess 17. The male connector 13 in this embodiment has a head portion 35 which is formed by the elongate groove 31. The head portion 35 locates in the elongate groove 31 and helps to align the male connector 13 within the female connector 11 when the trim panel 1 is re-attached.

Figure 5:
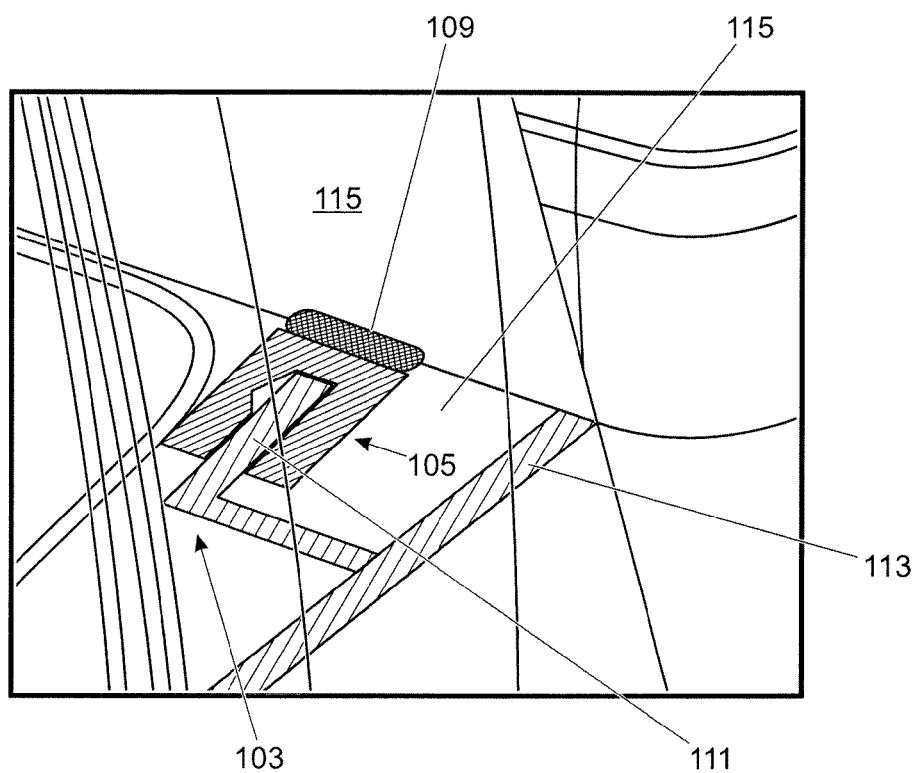
FIG. 5 shows a perspective sectional view of the connection arrangement illustrated in FIGS. 4A and 4B.

A schematic sectional view of a fixing arrangement for a trim panel 101 according to a third embodiment of the present invention is shown in FIGS. 4A, 4B and 5. The trim panel 101 is a polygon in plan form and has an inner surface and an outer surface.

The fixing arrangement comprises first and second cooperating connectors 103, 105 which are formed independently of each other. The first connector 103 is formed integrally with the trim panel 101 and extends around the circumference of the trim panel 101 on said inner surface. An injection moulding technique can be used to form the trim panel 101, for example from polypropylene. The second connector 105 has a constant profile and is manufactured by an extrusion process. The second connector 105 is formed from a resilient material, such as an elastomer or polyurethane. The second connector 105 is fixedly bonded to a door frame member 107 by an adhesive 109, such as polyurethane, provided along an underside of the second connector 105. The first and second connectors 103, 105 form a substantially continuous joint around the circumference of the trim panel 101.

The first connector 103 comprises a first latching member 111 and a continuous skirt 113. An elongate tapered channel 115 is formed between the first latching member 111 and the continuous skirt 113. The second connector 105 comprises a second latching member 117 and a locating member 119 which locates in the tapered channel 115. The first and second latching features 111, 117 have respective first and second keyed portions 119, 121 which cooperate to releasably secure the first connector 103 to the second connector 105.

To mount the trim panel 101, the first and second connectors 103, 105 are coupled together such that the second connector 105 is supported along its length by the first connector; the first connector 103 thereby functions as a guide for the second connector 105. In the arrangement illustrated in FIG. 4A, the adhesive 109 is applied as a substantially continuous bead of viscous liquid to an underside of the second connector 105. The trim panel 101 is then located in a final position relative to the door frame member 107 and held in position to allow the adhesive 109 to cure. The skirt 113 reduces or prevents the adhesive 109 from spilling outwardly.

In the arrangement illustrated in FIG. 4B, the adhesive 109 is a substantially continuous strip of adhesive tape, such as acrylic tape, provided along an underside of the second connector 105. The adhesive tape can, for example, be applied as the second connector 105 is formed. The second connector 105 and the adhesive tape can be formed into the desired shape by coupling the second connector 105 to the first connector 103. The first connector 103 thereby functions as a guide for the second connector 105. The trim panel 101 is then located in a final position and the adhesive tape brought into contact with the door frame member 107 to fixedly mount the trim panel 101. A protective strip can be provided on the adhesive tape to preserve its adhesive properties until the trim panel 101 is ready for fitting.

The operation of the fixing arrangement according to the third embodiment is the same as for the first and second embodiments. In particular, the first and second connectors 103, 105 cooperate with each other to secure the trim panel 101 around its circumference. The strength and stiffness of the trim panel 101 can thereby be increased, potentially allowing a reduction in the thickness of the trim panel 101. The integrated fixing arrangement can potentially also improve NVH properties of the trim panel 101. A perspective sectional view through the trim panel 101 when mounted to a surface is illustrated in FIG. 5.

As the first and second connectors 103, 105 are formed separately, it is not necessary to use the first connector 103 as a guide for the second connector 105. Rather, the second connector 105 can be located on a dedicated guide member (not shown) which is profiled to match the first connector 103. The second connector 105 can be fixedly mounted to the door frame member 115 by bringing the guide member into the final position. The guide member can then be removed and the trim panel 101 releasably mounted by coupling the first connector 103 and the second connector 105 together. This approach allows the trim panel 101 to be fitted at a later stage in the manufacturing process.

The first and second connectors 103, 105 have been described as being formed independently of each other. An alternative approach would be to co-mould the first and second connector 103, 105 using a multi-shot moulding process. A first shot of a first material can be injected into a mould to form the trim panel 101 and the first connector 103. The mould can then be re-configured before a second shot of a second material is injected into the mould to form the second connector 105. The first and second materials are different and selected so as not to bond to each other. The first material can be polypropylene and the second material can be polyurethane.

The skirt 113 could be omitted from the first connector 103 and a continuous skirt (not shown) optionally provided on the second connector 105. The continuous skirt could be formed integrally with the second connector 105.

It will be appreciated that various changes and modifications can be made to the fixing arrangement described herein without departing from the scope of the present invention. For example, a sealing member could be formed in one or both of the connector components to form a seal to inhibit or prevent the ingress of moisture.

The present invention has been described with particular reference to a trim panel for a motor vehicle. It will be appreciated that the apparatus and techniques described herein can be employed in other applications. For example, the trim panel could be installed in other vehicle types, such as aircraft or boats. The invention(s) described herein are not limited to trim panels and could be used for mounting a sound-proofing panel.

Further aspects of the present invention are set out in the following numbered paragraphs:

1. A trim panel for a motor vehicle, the trim panel comprising:
   a first connector for mounting the trim panel;
   wherein said first connector is elongated and extends longitudinally along said trim panel.

2. A trim panel as described in paragraph 1, wherein said first connector comprises an elongate flange.

3. A trim panel as described in paragraph 1, wherein said first connector extends along an edge of said at least one side of the panel.

4. A trim panel as described in paragraph 1, wherein said first connector comprises a keyed profile.

5. A trim panel as described in paragraph 1, wherein said first connector is formed integrally with the panel.

6. A trim panel as described in paragraph 1 further comprising a skirt.

7. A trim panel as described in paragraph 1, wherein the first connector is a male connector for cooperating with a female connector; or the first connector is a female connector for cooperating with a male connector.

8. A trim panel as described in paragraph 1 in combination with a second connector, wherein the first connector is coupled to the second connector.

9. A trim panel as described in paragraph 8, wherein said second connector is moulded in the first connector.

10. A trim panel as described in paragraph 8, wherein an adhesive is provided on said second connector for fixedly mounting the second connector.

11. A method of mounting a trim panel as described in paragraph 10, the method comprising locating the trim panel in a final position in relation to a fixed panel to locate the second connector against said fixed panel.

12. A mounting assembly comprising a male connector and a female connector, wherein the male connector is moulded in said female connector.

13. A method of moulding a male connector co-operable with a female connector, the method comprising introducing a liquid compound into the female connector to form the male connector.

14. A method as described in paragraph 13, wherein the female connector is formed from a first material and the male connector is formed from a second material, the first and second materials being different from each other.

15. A method as described in paragraph 13, wherein the female connector has an under-cut for mechanically cooperating with the male connector.

16. A method as described in paragraph 13, wherein the female connector and the male connector are formed as part of a multi-shot moulding process, the moulding process comprising introducing a first shot of moulding material into a mould to mould the female connector and subsequently introducing a second shot of moulding material into the mould to form the male connector.

17. A vehicle comprising a trim panel described in paragraph 1.

18. A vehicle comprising a trim panel described in paragraph 12.

The invention claimed is:

1. A trim panel for a motor vehicle, the trim panel comprising:
   a first connector for mounting the trim panel;
   wherein said first connector is elongated and extends longitudinally along said trim panel, and
   said first connector is a male connector for cooperating with a female connector or said first connector is a female connector for cooperating with a male connector.

2. A trim panel as claimed in claim 1, wherein said first connector comprises an elongate flange.

3. A trim panel as claimed in claim 1, wherein said first connector extends along an edge of said at least one side of the trim panel.

4. A trim panel as claimed in claim 1, wherein said first connector comprises a keyed profile.

5. A trim panel as claimed in claim 1, wherein said first connector is formed integrally with the trim panel.

6. A trim panel as claimed in claim 1 further comprising a skirt.

7. A trim panel as claimed in claim 1 in combination with a second connector, wherein the first connector is coupled to the second connector.

8. A trim panel as claimed in claim 7, wherein said second connector is moulded in the first connector.

9. A trim panel as claimed in claim 7, wherein an adhesive is provided on said second connector for fixedly mounting the second connector.

10. A method of mounting a trim panel as claimed in claim 9, the method comprising locating the trim panel in a final position in relation to a fixed panel to locate the second connector against said fixed panel.

11. A mounting assembly comprising a male connector and a female connector, wherein the male connector is moulded in said female connector.

12. A method of moulding a male connector co-operable with a female connector, the method comprising introducing a liquid compound into the female connector to form the male connector.

13. A method as claimed in claim 12, wherein the female connector is formed from a first material and the male connector is formed from a second material, the first and second materials being different from each other.

14. A method as claimed in claim 12, wherein the female connector has an under-cut for mechanically cooperating with the male connector.

15. A method as claimed in claim 12, wherein the female connector and the male connector are formed as part of a multi-shot moulding process, the moulding process comprising introducing a first shot of moulding material into a mould to mould the female connector and subsequently introducing a second shot of moulding material into the mould to form the male connector.

16. A vehicle comprising a trim panel as claimed in claim 1.

17. A vehicle comprising a mounting assembly as claimed in claim 11.

18. A trim panel as claimed in claim 1, wherein the first connector extends along an edge of said trim panel to provide continuous support along the edge.

19. A mounting assembly as claimed in claim 11, wherein said male connector is releasable from said female connector.

20. A method as claimed in claim 12, comprising releasing the male connector from the female connector after the liquid compound has cured.

* * * * *